US010553182B1

(12) United States Patent
Chen

(10) Patent No.: US 10,553,182 B1
(45) Date of Patent: Feb. 4, 2020

(54) DISPLAY SYSTEM WITH LIGHT BARS ALONG THE EDGES OF THE DISPLAY

(71) Applicant: QISDA CORPORATION, Taoyuan (TW)

(72) Inventor: Wei-Jou Chen, Hsinchu County (TW)

(73) Assignee: Qisda Corporation, Taoyuan (TW)

( * ) Notice: Subject to any disclaimer, the term of this patent is extended or adjusted under 35 U.S.C. 154(b) by 0 days.

(21) Appl. No.: 16/106,003

(22) Filed: Aug. 21, 2018

(30) Foreign Application Priority Data

Aug. 2, 2018 (CN) .......................... 2018 1 0871571

(51) Int. Cl.
*G06F 3/045* (2006.01)
*G09G 5/10* (2006.01)
*G09G 5/02* (2006.01)

(52) U.S. Cl.
CPC ................. *G09G 5/10* (2013.01); *G09G 5/02* (2013.01); *G09G 2300/026* (2013.01); *G09G 2320/062* (2013.01); *G09G 2320/08* (2013.01); *G09G 2370/16* (2013.01)

(58) Field of Classification Search
CPC .......... G06F 3/041; G06F 3/045; G06F 3/038; G01R 27/26; G09G 5/00; G06K 11/06; G08C 21/00
See application file for complete search history.

(56) References Cited

U.S. PATENT DOCUMENTS 7,894,016 B2 * 2/2011 Hamada ............... G02B 6/0068 349/58
2015/0325211 A1 * 11/2015 Lee ....................... G06F 3/0481 345/1.3
2016/0163018 A1 * 6/2016 Wang ........................ G06T 1/20 345/504
2019/0197672 A1 * 6/2019 Lee .......................... G06F 3/14

* cited by examiner

*Primary Examiner* — Pegeman Karimi

(57) ABSTRACT

A display system includes a first display, a first light bar, and an electronic device. The first display displays a first image. The first light bar includes a plurality of light units disposed along part of a first edge of the first display. The electronic device includes an image capturing unit and a control unit. The image capturing unit captures an image of the first display and the first light bar whenever a light unit of the first light bar is turned on. The control unit identifies at least a first light unit and a last light unit of the first light bar along the first edge of the first display, and generates relative positions of the first light unit and the last light unit according to images captured by the image capturing unit and positions of edges of the first display.

20 Claims, 7 Drawing Sheets

DISPLAY SYSTEM WITH LIGHT BARS ALONG THE EDGES OF THE DISPLAY

BACKGROUND OF THE INVENTION

1. Field of the Invention

The present invention is related to a display system, and more particularly, to a display system with light bars along the edges of the display.

2. Description of the Prior Art

As the display technology grows, more and more visual effects are created. For example, the video walls built by multiple video display screens can present large size images, and are widely used in concerts, exhibitions, and malls for displaying the real-time performance and commercials. The huge size images displayed by the video walls can often provide exciting visual effect and appeal customers.

Also, to create even more exciting and novel visual effects, the video display screens may also combine with other devices such as light bars surrounding the video display screens. However, to meet the site requirement, these display devices will require different number of screens and form the video walls having different sizes and different shapes. Therefore, the setting of the display devices is complicated and requires lots of effort for adjustment.

SUMMARY OF THE INVENTION

One embodiment of the present invention discloses a display system. The display system includes a display, a light bar, and an electronic device.

The first display displays an image, and the image is at least part of a complete image. The light bar includes a plurality of light units disposed along at least part of an edge of the display. The plurality of light units of the light bar are turned on sequentially during a scan process.

The electronic device includes an image capturing unit, and a control unit. The image capturing unit captures an image of the display and the light bar whenever a light unit of the light bar is turned on. The control unit is coupled to the image capturing unit. The control unit identifies at least a first light unit and a last light unit of the light bar along the edge of the display, generates serial numbers of light units of the light bar along the edge of the display, and generates relative positions of the first light unit and the last light unit of the light bar along the edge of the display according to images captured by the image capturing unit during the scan process and positions of edges of the display.

During a display process, colors of light emitted by the light units of the light bar along the edge of the display are determined by part of image data of the image.

Another embodiment of the present invention discloses a method for operating a display system. The display system includes an electronic device, a display, and a light bar disposed along at least part of an edge of the display.

The method includes, during a scan process, deriving positions and directions of edges of the display in space, turning on a plurality of light units of the light bar sequentially, the electronic device capturing an image of the display and the light bar whenever a light unit of the light bar is turned on, the electronic device identifying at least a first light unit and a last light unit of the light bar along the edge of the display according to images captured by the electronic device, the electronic device generating serial numbers of light units of the light bar along the edge of the display, and the electronic device generating relative positions of the first light unit and the last light unit of the light bar on the edge of the display.

In addition, the method includes, during a display process, the first display displaying an image being at least part of a complete image, and the light units of the light bar along the edge of the display emitting light with colors determined by part of image data of the image.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
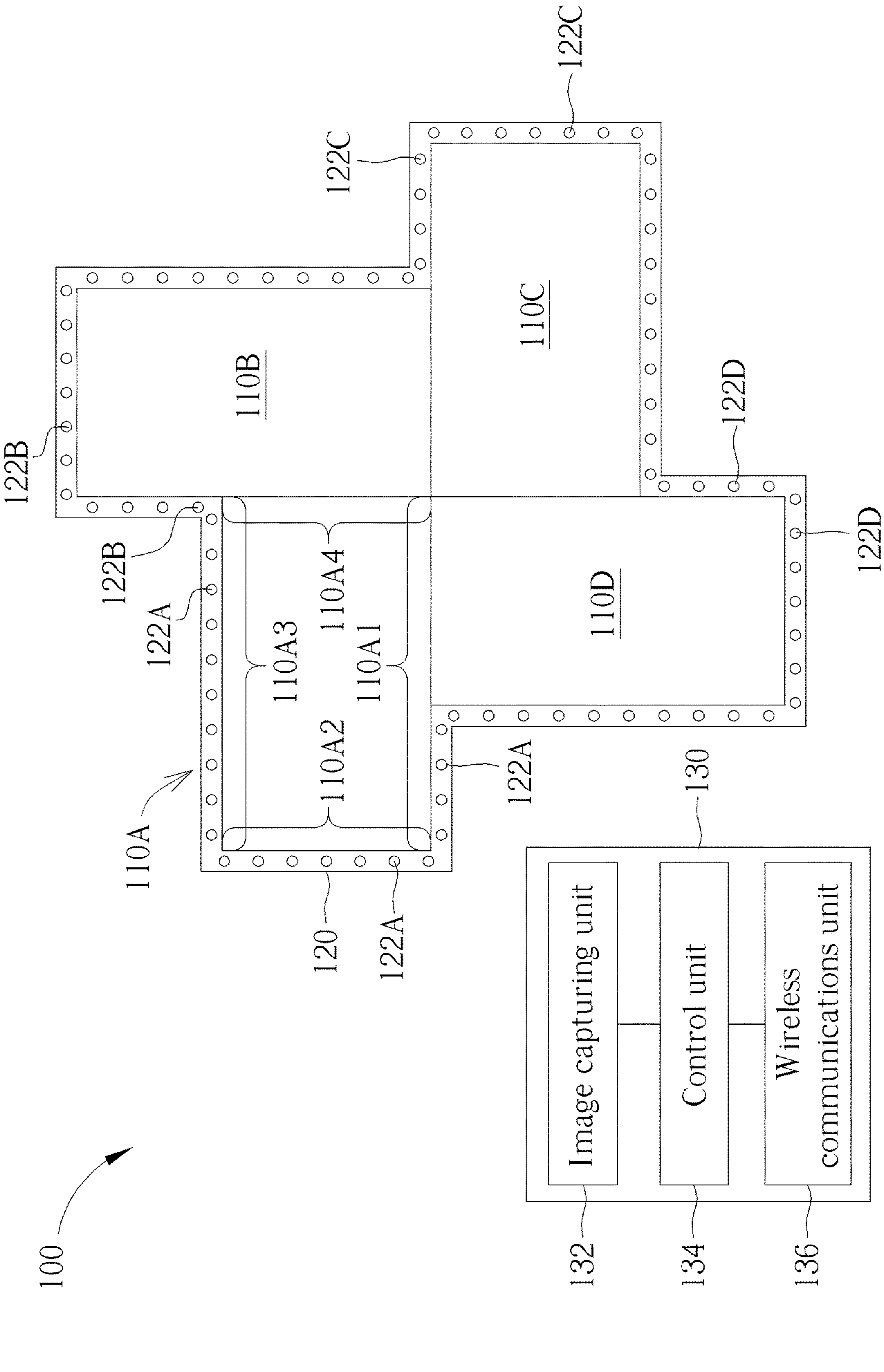
FIG. 1 shows a display system according to one embodiment of the present invention.

FIG. 1 shows a display system 100 according to one embodiment of the present invention. The display system 100 includes a first display 110A, a first light bar 120, and an electronic device 130.

The first light bar 120 includes a plurality of light units 122A disposed along the edges of first display 110A. For example, some of the light units 122A are disposed along part of the first edge 110A1 of the first display 110A. The electronic device 130 includes an image capturing unit 132 and a control unit 134, and the control unit 134 is coupled to the image capturing unit 132. In some embodiments, the light units 122A to 122D of the first light bar 120 can be light emitting diodes. Also, in some embodiments, the electronic device 130 can be, for example but not limited to, a smart phone, a tablet, or a notebook.

During the display process of the display system 100, the first display 110A can display a first image, and the colors of light emitted by the light units 122A of the first light bar 120 can be determined by part of the image data of the first image.

For example, the image data presented by the light units 122A of the first light bar 120 along the first edge 110A1 of the first display 110A can be the image data received by the corresponding pixels on the first edge 110A1 of the first display 110, or the image data supposedly to be received by pixels next to the corresponding pixels on the first edge 110A1 of the first display 110A. That is, the light bar 120 can be seen as an extension of the first display 110A for presenting images with the first display 110A, creating dynamic and refreshing visual effects.

Figure 2:
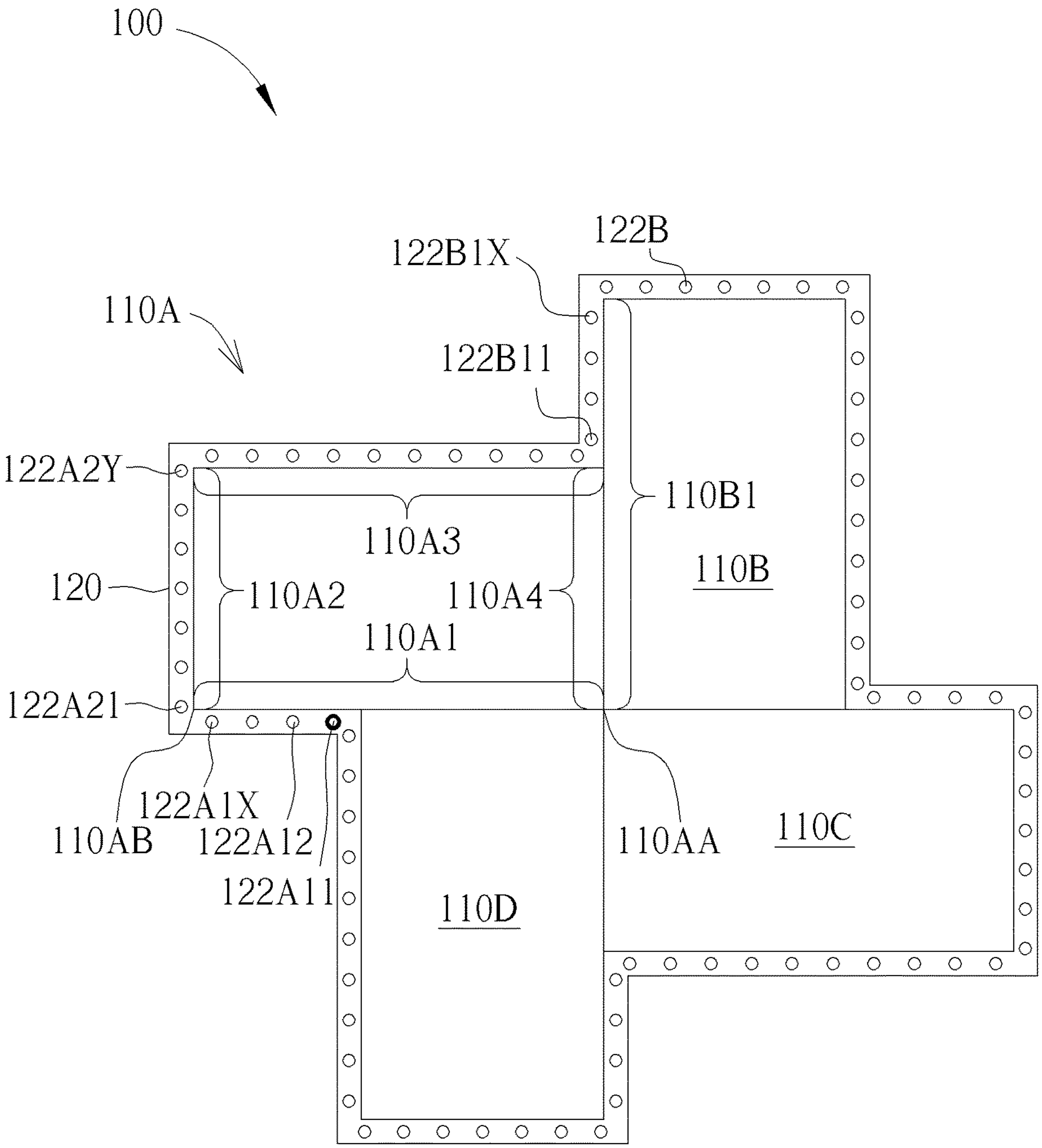
FIGS. 2 to 5 show some of the images captured by the image capturing unit during the scan process of the display system in FIG. 1.
Figure 3:
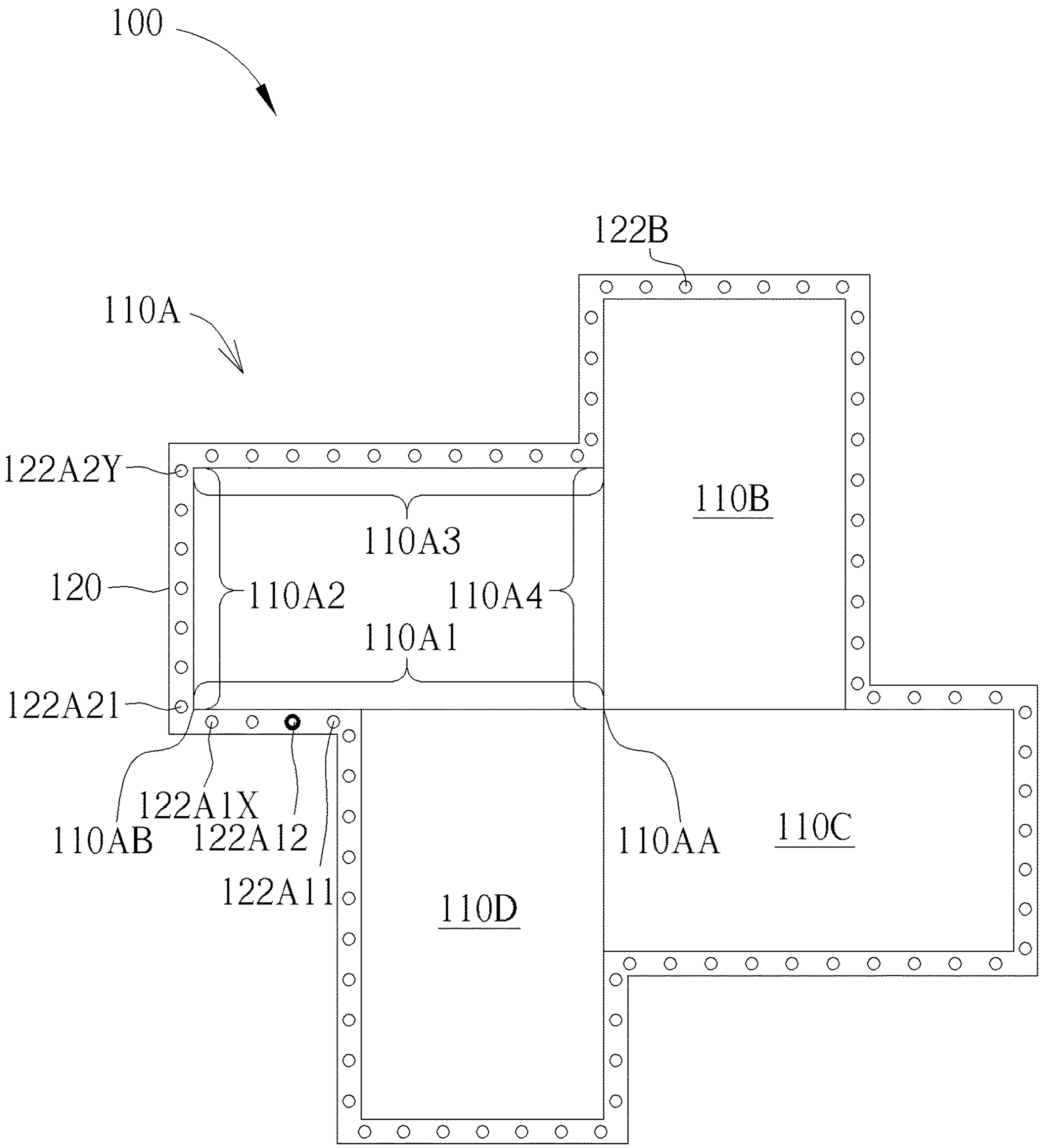
Figure 4:
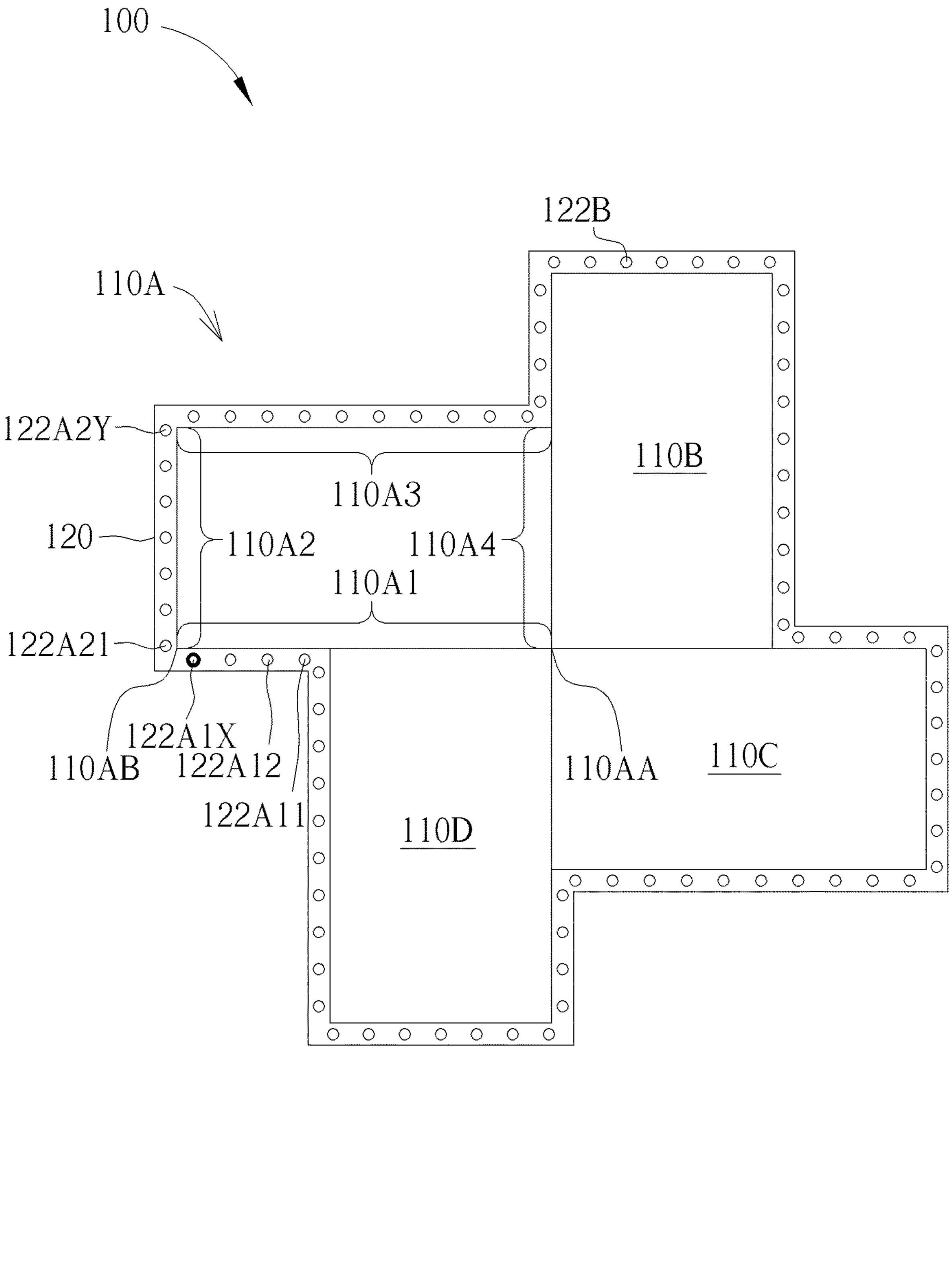

To create the desired visual effects, the part of image data to be presented by the light units 122A to 122D of the first light bar 120 can be determined during a scan process. For example, during the scan process, the light units 122A of the first light bar 120 can be turned on sequentially. That is, the light units 122A of the first light bar 120 are turned on one by one. Also, the image capturing unit 132 can capture an image of the first display 110A and the first light bar 120 whenever a light unit 122A of the first light bar 120 is turned on For example, FIGS. 2 to 5 show some of the images captured by the image capturing unit 132 during the scan process of the display system 100. In FIG. 2, the first light unit 122A11 of the first light bar 120 along the first edge 110A1 of the first display 110A is turned on. In FIG. 3, the second light unit 122A12 of the first light bar 120 along the first edge 110A1 of the first display 110A is turned on. Similarly, the following light units 122A along the first edge 110A1 of the first display 110A are turned on sequentially, and in FIG. 4, the last light unit 122A1X of the first light bar 120 along the first edge 110A1 of the first display 110A is turned on. Next, in FIG. 5, the first light unit 122A21 of the first light bar 120 along the second edge 110A2 of the first display 110A is turned on.

In this case, the control unit 134 can identify the first light unit 122A11 of the first light bar 120 long the first edge 110A1 of the first display 110A when the first light unit 122A11 of the first light bar 120 along the first edge 110A1 is turned on as shown in FIG. 2.

Figure 5:
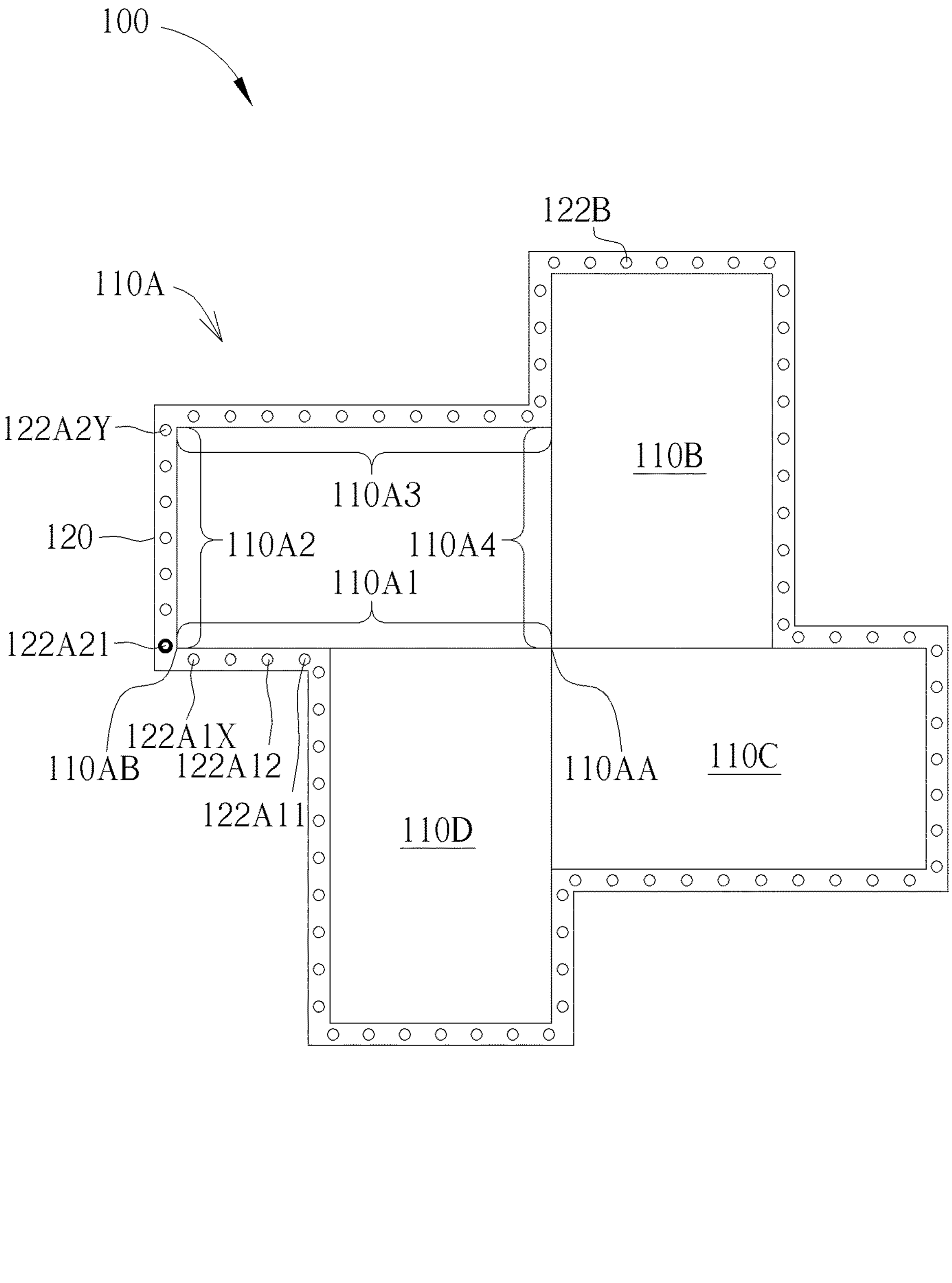

Also, when the first light unit 122A21 of the first light bar 120 along the second edge 110A2 of the first display 110A emits light as shown in FIG. 5, the control unit 134 would be aware that the light units 122A along the first edge 110A1 of the first display 110A have all been turned on previously, and thus, the control unit 134 can identify the last light unit 122A1X of the first light bar 120 along the first edge 110A1 of the first display 110A accordingly.

In addition, the control unit 134 can generate the serial numbers of the light units 122A of the first light bar 120 along the first edge 110A1 of the first display 110A during the scan process, and generate the relative positions of the first light unit 122A11 and the last light unit 122A1X of the first light bar 120 on the first edge 110A1 of the first display 110A according to the images captured by the image capturing unit 132 during the scan process and positions of edges of the first display 110A.

For example, in FIG. 1, there are, for example but not limited to, four light units 122A along the first edge 110A1 of the first display 110A, therefore, as the first light unit 122A11 and the last light unit 122A1X are identified by the control unit 134, the control unit 134 can assign the serial number to the four light units 122A, such as No. 1 to No. 4. Consequently, the four light units 122A can be controlled specifically and independently by the control unit 134.

In addition, according to the images captured by the image capturing unit 132, the relative positions of the first initial light unit 122A11 and the last light unit 122A1X of the first light bar 120 on the first edge 110A1 of the first display 110A can be determined. For example, in FIG. 1, if the corner 110AA of the first display 110A is taken as the initial terminal of the first edge 110A1 and the corner 110AB is taken as the ending terminal of the first edge 110A1, then the control unit 134 can determine that the first light unit 122A11 is near the middle of the first edge 110A1 and relatively closer to corner 110AB of the first edge 110A1 according to the image as shown in FIG. 2. In this case, the relative position of first initial light unit 122A11 along the first edge 110A1 of the first display 110A can be denoted as, for example, but not limited to, 0.6 or 60%.

Similarly, since the last light unit 122A1X is at the end terminal of the first edge 110A1 of the first display 110A, the relative position of first initial light unit 122A1X on the first edge 110A1 of the first display 110A can be denoted as 1 or 100% accordingly.

Consequently, the part of image data of the first image to be presented by the light units 122A of the first light bar 120 along the first edge 110A1 can be derived according to the relative positions of the first light unit 122A11 and the last light unit 122A1X on the first edge 110A1 of the first display 110A and the serial numbers of the light units 122A of the first light bar 120 along the first edge 110A1.

For example, the first light bar 120 can be coupled to a light bar controller (which is not depicted in FIG. 1) disposed in the first display 110A, and, with the relative positions of the first light unit 122A11 and the last light unit 122A1X on the first edge 110A1 of the first display 110A, the light bar controller can determine the related part of the first image to be presented by the first light unit 122A11 and the last light unit 122A1X, that is, the data image to be presented by the pixels corresponding to the first light unit 122A11 and the last light unit 122A1X. Also, with the serial numbers of the light units 122A of the first light bar 120 along the first edge 110A1, the image data to be presented by the light units 122A along the first edge 110A1 can all be determined by finding the corresponding pixels of the first display 110A according to the related part of the first image to be presented by the first light unit 122A11 and the last light unit 122A1X by, for example but not limited to, interpolation.

In some embodiments, the positions of edges of the first display 110A and the disposing direction of the first display 110A can be determined in advance and can be known factors for the control unit 134 (e.g., the techniques taught in US patent Publication No. 20170337028). Therefore, the control unit 134 can identify the first edge 110A1 of the first display 110A, determine the relative positions of the light units 122A on the first edge 110A1 according to the images captured by the image capturing unit 132, and determine the image data to be presented by the light units 122A along the first edge 110A of the first display 110A.

In FIG. 1, part of the first light bar 120 is disposed along the second edge 110A2 of the first display 110A connecting to the first edge 110A1 of the first display 110A. In this case, the control unit 134 can also identify the first light unit 122A21 and the last light unit 122A2Y of the first light bar 120 along the second edge 110A2 of the first display 110A according to the images captured by the image capturing unit 132 during the scan process, for example, FIG. 5.

The control unit 134 can record the serial numbers of the light units 122A of the first light bar 120 along the second edge 110A2 of the first display 110A, and record the relative positions of the first light unit 122A21 and the last light unit 122A2Y on the second edge 110A2 of the first display 110A.

Consequently, the part of image data of the first image to be presented by the light units 122A of the first light bar 120 along the second edge 110A2 of the first display 110A can be derived accordingly. Similarly, the part of image data of the first image to be presented by the light units 122A of the first light bar 120 along the third edge 110A3 of the first display 110A can also be derived during the scan process with the same approach.

In FIG. 1, the display system 100 further includes a second display 110B, a third display 110C, and a fourth display 110D. The displays 110A to 110D can be spliced together to form a video wall. That is, the images displayed by the displays 110A to 110D can be different parts of a complete image. In addition, the first light bar 120 can also be disposed along the edges of the displays 110B to 110D. For example, the first light bar 120 is disposed along part of the first edge 110B1 of the second display 110B.

In this case, the light units 122B of the first light bar 120 along the first edge 110B1 of the second display 110B will also be turned on sequentially and the image capturing unit 132 will capture the images of them accordingly. Therefore, the control unit 134 can also identify the first light unit 122B11 and the last light unit 122B1X of the first light bar 120 along the first edge 110B1 of the second display 110B according to the images captured by the image capturing unit 132 during the scan process and the positions of edges of the second display 110B determined in advance.

With similar approaches aforementioned, the control unit 134 can record the serial numbers of the light units 122B of the first light bar 120 along the first edge 110B1 of the second display 110B, and record the relative positions of the first light unit 122B11 and the last light unit 122B1X on the first edge 110B1 of the second display 110B as shown in FIGS. 2 to 5. Consequently, during the display process, the light units 122B of the first light bar 120 along the first edge 110B1 of the second display 110B can emit light according to the related part of image data of the second image displayed by the second display 110B.

With the display system 100, the first light bar 120 can be disposed along the edges of the spliced displays 110A and 110D, and the relative positions of the light units 122A to 122D of the first light bar 120 on the edges of the spliced displays 110A and 110D can be determined during the scan process automatically, reducing complicated manual operations and simplifying the system set up process.

However, in some embodiments, according to the application requirement, the display system 100 may include more displays or fewer displays. For example, the display system 100 may include ten displays or only one display. Furthermore, in some embodiments, the first light bar may not cover all the outer edges of the spliced displays, and may cover only parts of the outer edges of the spliced displays. However, the same scan process aforementioned can be applied to the display systems with different numbers of displays and with different shapes of the spliced displays.

In some embodiments, the first light bar 120 can be coupled to the light bar controller (which is not depicted in FIG. 1) disposed in the first display 110A, and the light bar controller can control the first light bar 120 according to the demands from the electronic device 130. For example, in FIG. 1, the electronic device 130 can further include a wireless communications unit 136. The wireless communications unit 136 can build wireless communications between the electronic device 130 and the first display 110A. In this case, the control unit 134 can demand the light bar controller in the first display 110A to activate the plurality of light units 122A of the first light bar 120 to emit light sequentially during the scan process through the wireless communications. Also, the light bar controller can decide the color and the brightness to be presented by the first light bar 120 according to the image data of the complete image, and the positions and the serial numbers of the light units in the first light bar 120. In some embodiments, the light bar controller can be disposed in the display 110A, however, in some other embodiments, the light bar controller can also be an external device disposed outside of the display 110A.

In addition, in some embodiments, the first light bar 120 may pass its control commands through the light units 122A, that is, the command to be received by the last light unit 122A in the first light bar 120 is actually passed by every light unit 122A in the first light bar 120. Therefore, the longer the first light bar 120 and the more light units 122A in the first light bar 120, the longer it will take to control all the light units 122A. In this case, if the first light bar 120 is disposed to surround many displays, then the light units 122A may not be controlled to emit the light accordingly in time as the images displayed by the displays change.

Figure 6:
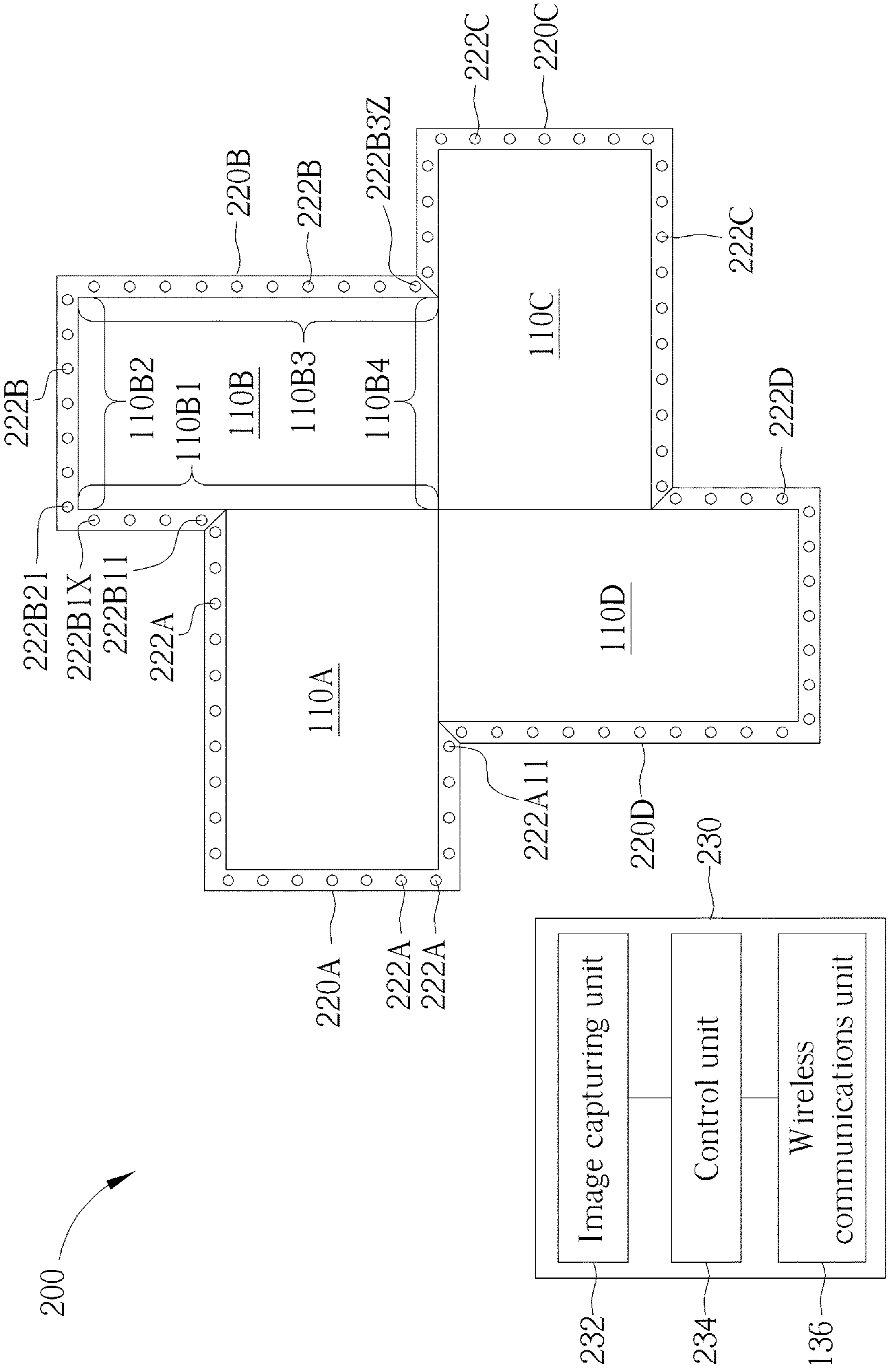
FIG. 6 shows a display system according to another embodiment of the present invention.

Therefore, in some embodiments, the display system may include more light bars. FIG. 6 shows a display system 200 according to another embodiment of the present invention. The display system 200 and the display system 100 have similar structures and can be operated with similar principles. However, the display system 200 includes a first light bar 220A and a second light bar 220B. The second light bar 220B includes a plurality of light units 222B disposed along the edges of the second display 110B.

During the scan process, the second light bar 220B can active each light unit 222B of the second light bar 220B to emit light sequentially, and the image capturing unit 232 would capture the image of the second light bar 220B and the second display 110B whenever a light unit 222B emits light. Consequently, the control unit 234 would be able to identify the light units 222B on each edge of the second display 110B according to the images captured by the image capturing unit 232 and the positions of edges of the second display 110B.

For example, with the similar images shown in FIGS. 2 to 5, the control unit 234 can identify the first light unit 222B11 and the last light unit 222B1X of the second light bar 220B along the first edge 110B1 of the second display 110B according to the images captured by the image capturing unit 232 and the positions of edges of the second display 110B. Consequently, during the display process, the light units 222B of the second light bar 220B along the first edge 110B1 of the second display 110B can emit light according to the part of image data of the second image.

In some embodiments, the light bars 220A to 220D can be controlled by different light bar controllers disposed in the displays 110A to 110D. For example, the first light bar 220A may be controlled by a light bar controller disposed in the first display 110A, and the second light bar 220B may be controlled by a light bar controller disposed in the second display 110B. Since the light bars 220A to 220D can be controlled by different light bar controllers, the time required for transmitting commands to the light units in the light bars 220A to 220D can be reduced.

Also, in some embodiments, the last light unit 222B1X can be identified when the first light unit 222B21 along the second edge 110B2 of the second display 110B is turned on and captured by the image capturing unit 232. However, since the second light bar 220B does not disposed along the fourth edge 110B4 of the second display 110B, the control unit 234 may identify the last light unit 222B3Z of the second light bar 220B along the third edge 110B3 of the second display 110B when no more light unit emits light during the scan process.

In addition, by adjusting the capturing angle and the capturing distance, the image capturing unit 232 can capture the displays 110A to 110B and the light bars 220A and 220B in the same image. In this case, the first light unit 222A11 of the first light bar 220A along the first edge 110A1 of the first display 110A and the first light unit 222B11 of the second light bar 220B along the first edge 110B1 of the second display 110B can emit light simultaneously with different colors during the scan process, and the control unit 234 can identify the first light unit 222A11 and the first light unit 222B11 according to the same image captured by the image capturing unit 232. That is, the scan process for the first light bar 220A and the second light bar 220B can be performed in parallel, reducing the required processing time.

Similarly, in FIG. 6, the display system 200 can further include a third light bar 220C along the edges of the third display 110C and a fourth light bar 220D along the edge of the fourth display 110D. Also, the similar scan process can be applied to the third light bar 220C and the fourth light bar 220D, and the scan processes for the light bars 220A to 220D can be performed concurrently.

Consequently, with the display system 200, the different light bars 220A to 220D can be disposed along the edges of the spliced displays 110A and 110D, and the relative positions of the light units of the different light bars 220A to 220D on the edges of the spliced displays 110A and 110D can be determined during the scan process automatically, reducing complicated manual operations and simplifying the system set up process.

Figure 7:
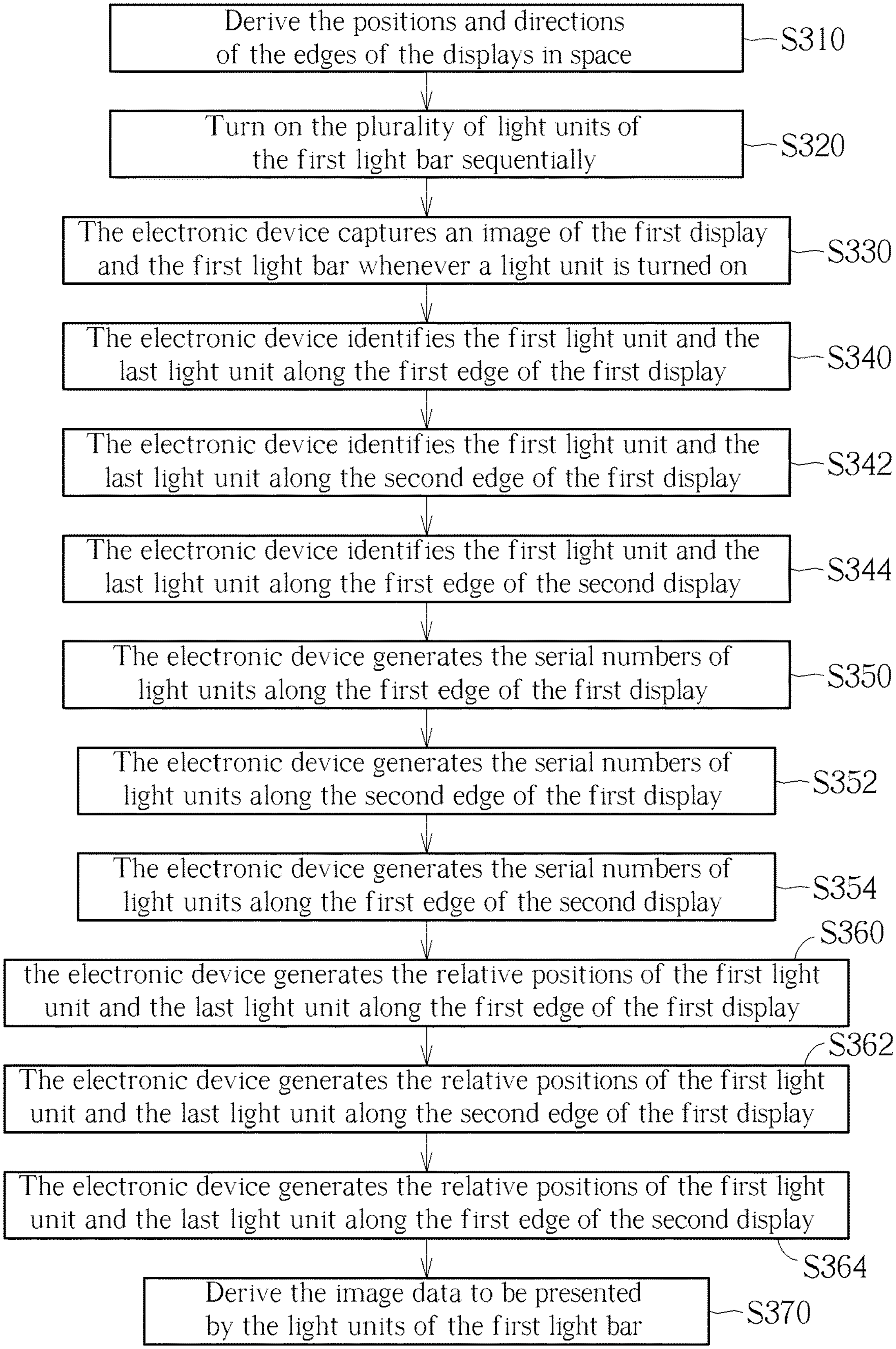
FIG. 7 shows a method for operating the display system in FIG. 1 according to one embodiment of the present invention.

FIG. 7 shows a method 300 for operating the display system 100 during the scan process according to one embodiment of the present invention. The method 300 includes steps S310 to S370, but is not limited to the order shown in FIG. 7.

S310: derive the positions and directions of the edges of the displays 110A to 110D in space;

S320: turn on the plurality of light units 122A of the first light bar 120 sequentially;

S330: the electronic device 130 captures an image of the first display 110A and the first light bar 120 whenever a light unit of the first light bar 120 is turned on;

S340: the electronic device 130 identifies the first light unit 122A11 and the last light unit 122A1X of the first light bar 120 along the first edge 110A1 of the first display 110A according to the images captured by the electronic device 130;

S342: the electronic device 130 identifies the first light unit 122A21 and the last light unit 122A2Y of the first light bar 120 along the second edge 110A2 of the first display 110A according to images captured by the electronic device 130;

S344: the electronic device 130 identifies the first light unit 122B11 and the last light unit 122B1X of the first light bar 120 along the first edge 110B1 of the second display 110B according to images captured by the electronic device 130;

S350: the electronic device 130 generates the serial numbers of light units 122A of the first light bar 120 along the first edge 110A1 of the first display 110A;

S352: the electronic device 130 generates the serial numbers of light units 122A of the first light bar 120 along the second edge 110A2 of the first display 110A;

S354: the electronic device 130 generates the serial numbers of light units 122B of the first light bar 120 along the first edge 110B1 of the second display 110B;

S360: the electronic device 130 generates the relative positions of the first light unit 122A11 and the last light unit 122A1X of the first light bar 120 along the first edge 110A1 of the first display 110A;

S362: the electronic device 130 generates the relative positions of the first light unit 122A21 and the last light unit 122A2Y of the first light bar 120 along the second edge 110A2 of the first display 110A;

S364: the electronic device 130 generates the relative positions of the first light unit 122B11 and the last light unit 122B1X of the first light bar 120 along the first edge 110B1 of the second display 110B;

S370: derive the image data to be presented by the light units 122A to 122D of the first light bar 120 according to the serial numbers of the light units 122A, 122B, 122C, 122D of the first light bar 120 along the edges of the displays 110A to 110D, and the relative positions of the first light units and the last light units of the first light bar 120 on the edges of the displays 110A to 110D.

With the method 300, the image data to be presented by the light units 122A of the first light bar 120 can be determined during the scan process. Consequently, during the display process, the first display 110A and the second display 110B can display the first image and the second image respectively, the light units 122A of the first light bar 120 along the edges of the first display 110A can emit light according to the corresponding part of image part of the first image, and the light units 122B of the first light bar 120 along the edges of the second display 110B can emit light according to the corresponding part of image part of the second image.

Furthermore, in the some embodiments, the display system may include more light bars. For example in FIG. 6, the display system 200 can include the light bars 220A to 220D, each along the edges of the displays 110A to 110D. In this case, similar approaches shown in FIG. 7 can also be applied to perform the scan process. However, to further reduce the set up time, the first light unit 222A11 of the first light bar 220A and the first light unit 222B11 of the second light bar 220B can emit light simultaneously with different colors. Consequently, the electronic device 230 can identify the first light unit 222A11 of the first light bar 220A along the first edge 110A1 of the first display 110A and the first light unit 222B11 of the second light bar 220B along the first edge 110B1 of the second display 110B according to the same image.

In summary, the display systems and the method for operating the display systems provided by the embodiments of the present invention can determine the relative positions of the light units of the light bars on the edges of the spliced displays during the scan process automatically. Therefore, the image data to be presented by the light units of the light bars during the display process can be determined accordingly, and the desired visual effects can be created. Furthermore, the complicate manual operations for setting up the display system can be saved, and the set up time can also be reduced.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A display system comprising:

a first display configured to display a first image, and the first image being at least part of a complete image;

a first light bar comprising a plurality of light units disposed along at least part of a first edge of the first display, the plurality of light units of the first light bar being turned on sequentially during a scan process; and an electronic device comprising:

an image capturing unit; and a control unit coupled to the image capturing unit, and configured to identify at least a first light unit and a last light unit of the first light bar along the first edge of the first display, generate serial numbers of light units of the first light bar along the first edge of the first display, and generate relative positions of the first light unit and the last light unit of the first light bar along the first edge of the first display according to images captured by the image capturing unit whenever a light unit of the first light bar is turned on during the scan process and positions of edges of the first display;

wherein:

during a display process, colors of light emitted by the light units of the first light bar along the first edge of the first display are determined by a part of image data of the first image.

2. The display system of claim 1, wherein:

the part of image data of the first image is image data received by corresponding pixels on the first edge of the first display, or image data supposedly to be received by pixels next to the corresponding pixels on the first edge of the first display.

3. The display system of claim 1, wherein:

the part of image data of the first image are derived according to serial numbers of light units of the first light bar along the first edge of the first display, and the relative positions of the first light unit and the last light unit of the first light bar on the first edge of the first display.

4. The display system of claim 1, wherein:

the first light bar is further disposed along at least part of a second edge of the first display connecting to the first edge of the first display; and the control unit is further configured to identify a first light unit and a last light unit of the first light bar along the second edge of the first display according to the images captured by the image capturing unit during the scan process, record serial numbers of light units of the first light bar along the second edge of the first display, and record relative positions of the first light unit and the last light unit of the first light bar on the second edge of the first display.

5. The display system of claim 4, wherein:

the control unit identifies the last light unit of the first light bar along the first edge of the first display when the first light unit of the first light bar along the second edge of the first display emits light.

6. The display system of claim 1, wherein:

the control unit identifies the last light unit of the first light bar along the first edge of the first display when no more light unit emits light during the scan process.

7. The display system of claim 1, further comprising:

a second display at least partly spliced with the first display, and configured to display a second image, and the second image being a part of the complete image;

wherein:

the first light bar is further disposed along at least part of a first edge of the second display;

the control unit is further configured to identify positions of a first light unit and a last light unit of the first light bar along the first edge of the second display according to the images captured by the image capturing unit during the scan process and positions of edges of the second display; and during the display process, light units of the first light bar along the first edge of the second display emit light according to a part of image data of the second image.

8. The display system of claim 1, further comprising:

a second display at least partly spliced with the first display, and configured to display a second image, and the second image being a part of the complete image; and a second light bar comprising a plurality of light units disposed along at least part of a first edge of the second display, configured to active each light units of the second light bar to emit light sequentially during the scan process;

wherein:

the control unit is further configured to identify positions of a first light unit and a last light unit of the second light bar along the first edge of the second display according to the images captured by the image capturing unit during the scan process and positions of edges of the second display; and during the display process, light units of the second light bar along the first edge of the second display emit light according to part of image data of the second image.

9. The display system of claim 8, wherein:

during the scan process, the first light unit of the first light bar along the first edge of the first display and the first light unit of the second light bar along the first edge of the second display emit light simultaneously with different colors.

10. The display system of claim 1, wherein:

the electronic device further comprises a wireless communication unit configured to build a wireless communication between the electronic device and the first display; and the control unit is further configured to demand the first display to activate the plurality of light units of the first light bar to emit light sequentially during the scan process through the wireless communication.

11. A method for operating a display system, the display system comprising an electronic device, a first display and a first light bar disposed along at least part of a first edge of the first display, and the method comprising during a scan process:

deriving positions and directions of edges of the first display in space;

turning on a plurality of light units of the first light bar sequentially;

the electronic device capturing an image of the first display and the first light bar whenever a light unit of the first light bar is turned on; and the electronic device identifying at least a first light unit and a last light unit of the first light bar along the first edge of the first display according to images captured by the electronic device;

the electronic device generating serial numbers of light units of the first light bar along the first edge of the first display; and the electronic device generating relative positions of the first light unit and the last light unit of the first light bar on the first edge of the first display; and during a display process:

the first display displaying a first image, and the first image being at least part of a complete image; and the light units of the first light bar along the first edge of the first display emitting light with colors determined by a part of image data of the first image.

12. The method of claim 11, wherein:

the part of image data of the first image are image data received by corresponding pixels on the first edge of the first display, or image data supposedly to be received by pixels next to the corresponding pixels on the first edge of the first display.

13. The method of claim 11, further comprising:

deriving the part of image data of the first image according to the serial numbers of the light units of the first light bar along the first edge of the first display, and the relative positions of the first light unit and the last light unit of the first light bar on the first edge of the first display.

14. The method of claim 11, wherein:

the first light bar is further disposed along at least part of a second edge of the first display connecting to the first edge of the first display; and the method further comprises during the scan process:

the electronic device identifying at least a first light unit and a last light unit of the first light bar along the second edge of the first display according to images captured by the electronic device;

the electronic device generating serial numbers of light units of the first light bar along the second edge of the first display; and the electronic device generating relative positions of the first light unit and the last light unit of the first light bar along the second edge of the first display.

15. The method of claim 14, wherein:

the electronic device identifies the first light unit of the first light bar along the first edge of the first display when the first light unit of the first light bar along the second edge of the first display emits light.

16. The method of claim 11, wherein:

the electronic device identifies the first light unit of the first light bar when no more light unit emits light during the scan process.

17. The method of claim 11, wherein:

the display system further comprises a second display at least partly spliced with the first display;

the first light bar is further disposed along at least part of a first edge of the second display; and the method further comprising:

deriving positions and directions of edges of the second display in the space;

during the scan process:

the electronic device identifying a first light unit and a last light unit of the first light bar along the first edge of the second display according to images captured by the electronic device;

the electronic device generating serial numbers of light units of the first light bar along the first edge of the second display; and the electronic device generating relative positions of the first light unit and the last light unit of the first light bar along the first edge of the second display; and during the display process:

the second display displaying a second image, and the second image being part of the complete image different from the first image; and the light units of the first light bar along the first edge of the second display emitting light according to part of image data of the second image.

18. The method of claim 11, wherein:

the display system further comprises a second display at least partly spliced with the first display, and a second light bar comprising a plurality of light units disposed along at least part of a first edge of the second display; and the method further comprises:

deriving positions and directions of edges of the second display in the space;

during the scan process:

the electronic device identifying a first light unit and a last light unit of the second light bar along the first edge of the second display according to images captured by the electronic device;

the electronic device generating serial numbers of light units of the second light bar along the first edge of the second display; and the electronic device generating relative positions of the first light unit and the last light unit of the second light bar along the first edge of the second display; and during the display process:

the second display displaying a second image, and the second image being part of the complete image different from the first image; and the light units of the second light bar along the first edge of the second display emitting light according to part of image data of the second image.

19. The method of claim 18, wherein:

during the scan process, the first light unit of the first light bar and the first light unit of the second light bar emit light simultaneously with different colors; and the electronic device identifies the first light unit of the first light bar along the first edge of the first display and the first light unit of the second light bar along the first edge of the second display according to a same image.

20. The method of claim 11, further comprising the electronic device controlling the first display to turn on the plurality of light units of the first light bar sequentially during the scan process through the wireless communication.

* * * * *